(No Model.)

J. B. ROBINSON.
COTTON CHOPPER.

No. 327,594. Patented Oct. 6, 1885.

Witnesses.
A. Ruppert
Alfred T. Gage

Inventor.
J. B. Robinson,
Per
Thomas P. Simpson,
Attorney.

UNITED STATES PATENT OFFICE.

JOHN BALEY ROBINSON, OF WILFORD, TENNESSEE.

COTTON-CHOPPER.

SPECIFICATION forming part of Letters Patent No. 327,594, dated October 6, 1885.

Application filed April 22, 1885. Serial No. 163,087. (No model.)

*To all whom it may concern:*

Be it known that I, J. B. ROBINSON, of Wilford, in the county of Wilson and State of Tennessee, have invented an Improved Cotton-Chopper, of which the following is a specification.

The object of the invention is to chop out and thus thin as well as work the rows of young cotton-plants after the scrapers have passed on each side of the rows.

Figure 1:
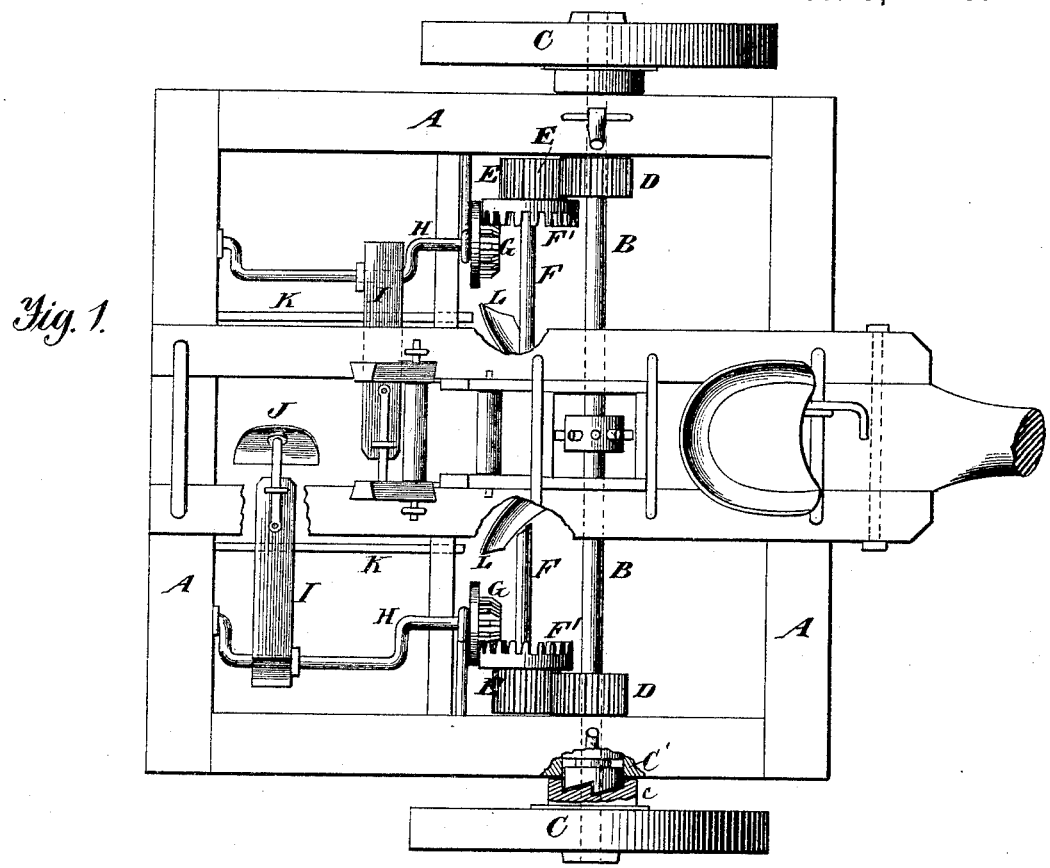
Figure 2:
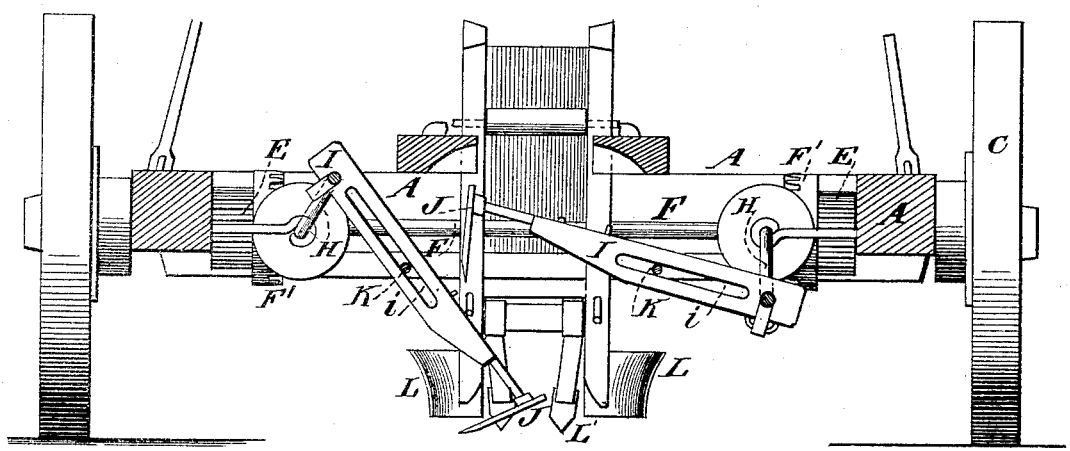

Figure 1 of the drawings is a plan view, broken away to show clutch and hoe-handle. Fig. 2 is a rear view in cross-section.

In the drawings, A represents the frame, in which the shaft B has its bearings. On the outer ends of this shaft are loosely arranged the ground-wheels C C, which may be clutched or unclutched with the shaft in any well-known way, or by the clutch $c$ $C'$. On this shaft, just inside of the frame, are placed the spur-wheels D D, which mesh with the spur-wheels E E on the counter-shaft F.

Attached rigidly to each of the spur-wheels E E are crown-wheels $F'$ $F'$, which mesh with the pinions G G on crank-shafts H H. To each of these crank-shafts is pivoted the rear end of a handle, I, carrying at its front end a hoe, J. The handles are provided with longitudinal slots $i$, through which pass the cross-bars K K, made fast to the frame. By this means the hoes are guided in their up and down motions. The mechanism is so graduated as to make them cut out a portion of the plants and leave a proper number at intervals in the rows, while the space between the growing plants is thus cultivated.

In front are the usual scrapers, L L, which run on each side of the rows in advance of the choppers.

$L'$ represents two shovels, which loosen up the soil next to the plants and in advance of the choppers, to facilitate their action and give a working to the crop as it is thinned out.

In bringing the machine to the field the wheels are unclutched from their shaft, so as not to operate the choppers, and the same may be done when turning at the ends of the rows.

Having thus described all that is necessary to a full understanding of my invention, what I claim as new, and desire to protect by Letters Patent, is—

A cotton-chopper having two hoes, J J, crossing each other from opposite directions, having handles pivoted on opposite sides of the frame and connected by separate trains of mechanism with the same drive-shaft, whereby the two hoes chop the same row of plants from opposite directions.

JOHN BALEY ROBINSON.

Witnesses:
I. B. ALSEY.
M. F. RHODES.